Aug. 7, 1945.  J. E. HALE  2,381,382
BEAD LOCK
Filed Aug. 22, 1941  4 Sheets-Sheet 1

INVENTOR
JAMES E. HALE
BY Ely & Frye
ATTORNEYS

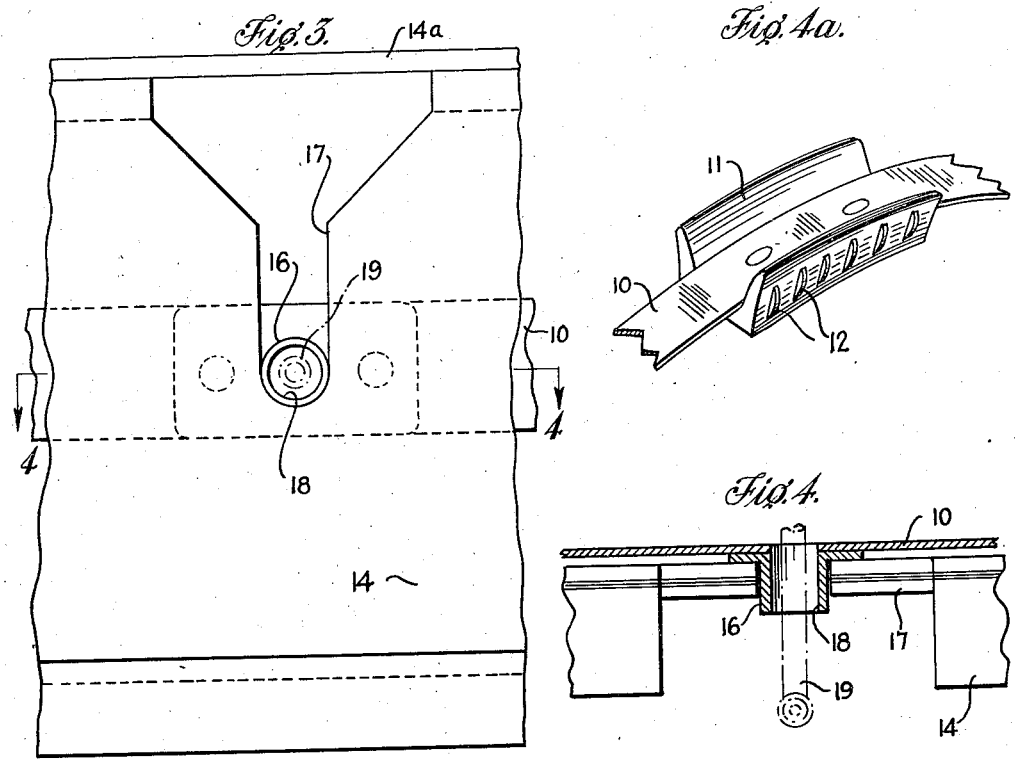
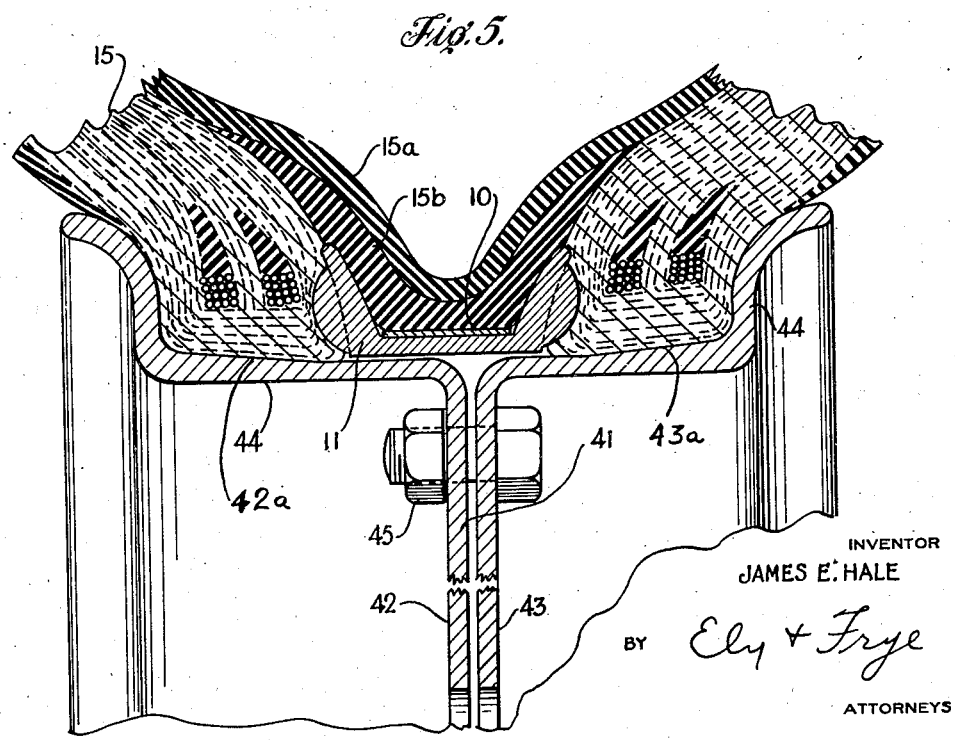

Aug. 7, 1945.  J. E. HALE  2,381,382
BEAD LOCK
Filed Aug. 22, 1941  4 Sheets-Sheet 3

INVENTOR
JAMES E. HALE
BY
Ely + Frye
ATTORNEYS

Aug. 7, 1945.  J. E. HALE  2,381,382
BEAD LOCK
Filed Aug. 22, 1941  4 Sheets-Sheet 4
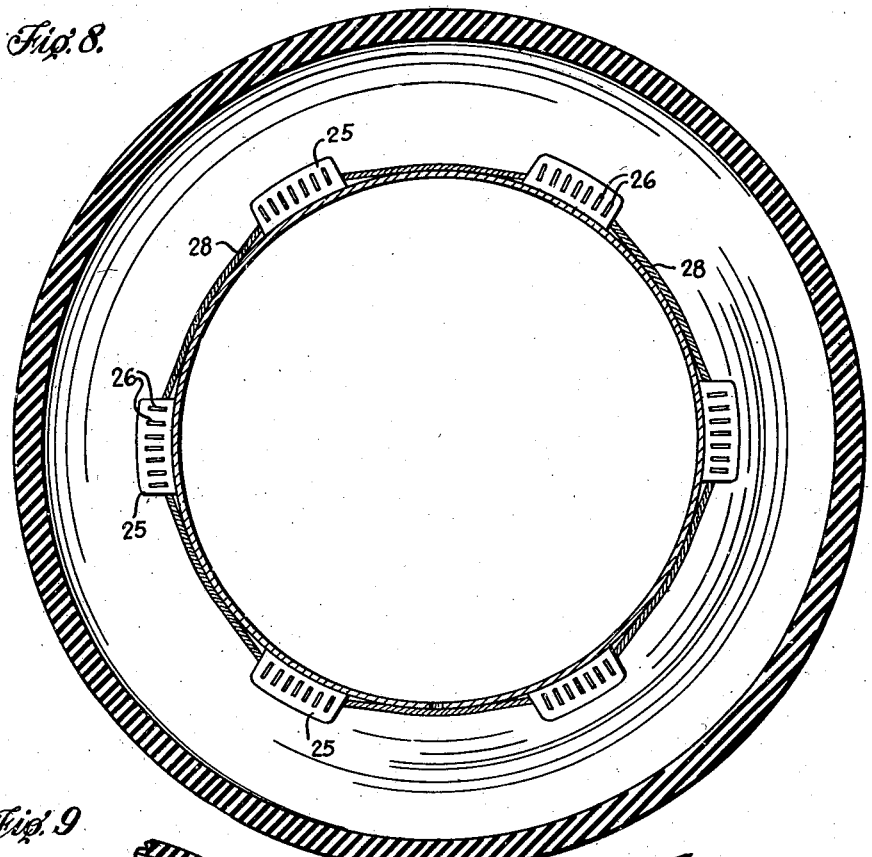
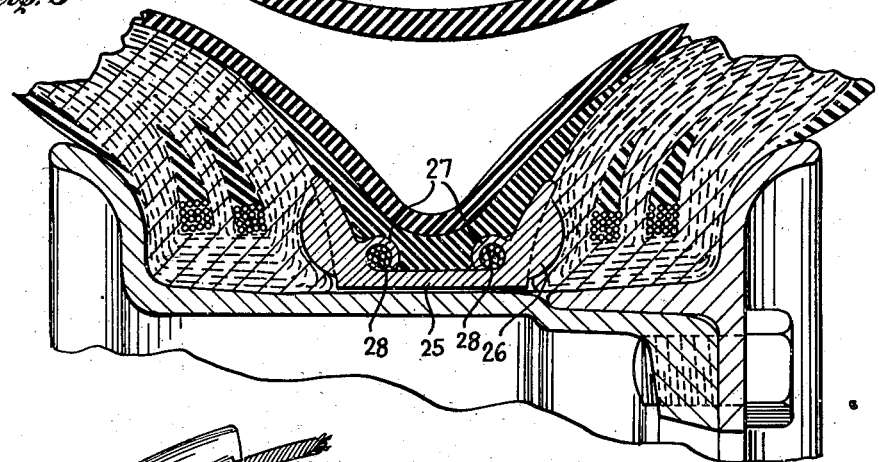
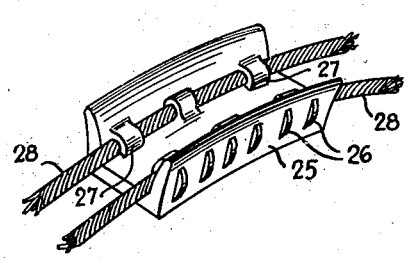
INVENTOR
JAMES E. HALE
BY
Ely & Frye
ATTORNEYS Patented Aug. 7, 1945

2,381,382

UNITED STATES PATENT OFFICE 2,381,382

BEAD LOCK

James E. Hale, Akron, Ohio, assignor to The Firestone Tire & Rubber Company, Akron, Ohio, a corporation of Ohio Application August 22, 1941, Serial No. 407,880

8 Claims. (Cl. 152—400)

This invention relates to bead locks for tire and rim assemblies, and more especially to bead locks adapted to retain a pneumatic tire casing on a tire rim, in torque-transmitting engagement therewith, even when the tire is under-inflated or else completely deflated.

When a pneumatic tire is mounted upon a conventional tire rim of the type that is substantially cylindrical and has a removable flange or side-ring on one edge thereof, it is obvious that the inside diameter of the tire beads must be somewhat larger than the bead seat diameter of the rim in order that the tire readily and conveniently can be applied to the rim, or removed therefrom, by the simple act of telescoping the tire beads over the rim.

In the driving of a motor vehicle, or in the braking thereof, the torques producing the change of motion of the vehicle must be transmitted through the tire without resulting slippage or creeping of the tire relatively of the rim. With properly inflated tires there is sufficient lateral pressure against the vertical faces of the tire beads to assure obtaining sufficient frictional contact between the outer lateral faces of the tire beads and the tire-rim-flanges to resist said slippage or creeping.

It is possible to compute the forces developed by the lateral pressure of the vertical faces of the tire beads against the rim flanges and demonstrate that if the pressure is adequate there is no need of auxiliary means to provide the driving or traction force, or braking resistance for the vehicle. However, if the air pressure in the tire becomes low in relation to the prescribed air pressure, or if the tire becomes completely deflated, then the absence of laterally outwardly directed pressure against the beads results in an absence of sufficient friction between the outer vertical walls of the tire beads and rim flanges sufficient to translate the said tractive and/or braking forces. Since such conditions are not of infrequent occurrence, it is desirable that supplemental means be provided for urging the tire beads outwardly into strong frictional engagement with the tire rim flanges.

When a circumferentially divided wheel or rim is used, it is possible to form tapered bead seats thereon that positively engage with the radially inner surfaces of the tire beads and provide a force which resists relative rotational movement between the pneumatic tire and the rim or wheel mounting same even though the tire is deflated. However, even with such rim or wheel constructions, it is necessary to provide positive means for forcing the outer vertical faces of the beads into frictional contact with the rim or wheel flanges to insure against relative rotational movement between the tire and the means mounting same under all operating conditions.

Attempts have been made to provide pneumatic tire and rim assemblies that can be operated, even though the pneumatic tire thereof is deflated, without causing rotation of the tire relatively of the rim, and without pulling the tire off the rim. Such assemblies generally involve the use of some type of an annular elastic compression member which is carried on the wheel or rim, and adapted to exert pressure upon the beads of a mounted tire to force the same laterally against the rim flanges. However, such continuous compressible members are costly, and are made from a mass of rubber, or similar composition, which may be difficult to obtain, or which may be difficult to insert in a tire, or which may heat up excessively in use.

The chief object of the invention is to provide mechanical means for producing a definite laterally directed pressure against the beads of a tire to force them against the flanges of a rim on which the tire is mounted, even when the tire is deflated. Such means may be termed a bead lock, or spreader device.

Another object of the invention is to provide an improved bead lock for a pneumatic tire assembly, which bead lock effectively retains the tire beads in fixed relation to a tire rim, and overcomes the aforementioned disadvantages of prior art constructions.

Another object is to provide a bead lock structure adapted for use with standard flat base tire rims that have either a continuous or a discontinuous removable side flange thereon ordinarily received in a gutter formed in one margin of the rim base, or for use with circumferentially divided rims or wheels.

Still another object is to retain a pneumatic tire on a tire rim so that the tire beads are held in fixed torque transmitting contact with the rim flanges regardless of the volume or pressure of air within the tire.

A further object of the invention is to provide apparatus for locking pneumatic tire beads in place and making the vehicle mounted on such tire maneuverable even though the tire is deflated.

Another object is to devise a bead lock which may be inserted in a tire with facility, even though the tire casing and beads are made so extremely heavy that they may carry their load without inflating air pressure.

Other objects will be manifest as the description proceeds.

Of the accompanying drawings:

Fig. 3 is a detail plan view of an anti-creep lug of the apparatus of Fig. 1;

Fig. 4 is a side elevational detail of the rim structure with the bead lock ring and anti-creep lug in section taken on line 4—4 of Fig. 3;

Fig. 4a is a perspective detail of one of the spreader elements shown in Fig. 1;

Fig. 5 is a transverse section through the bead lock of Fig. 1, showing it mounted on a split wheel;

Fig. 8 is a side elevation of another embodiment of the invention and with the tire and rim in section;

Fig. 9 is a transverse section of the embodiment of the bead lock, tire and rim of Fig. 8; and Fig. 10 is a perspective detail of one of the spreader elements shown in Figs. 8 and 9.

Referring now to Figs. 1 to 4 of the drawings there is shown a bead lock device comprising an endless, flexible, inextensible metal hoop or ring 10 upon which is mounted a plurality of metal blocks, or spreader units 11, 11. In this embodiment of the invention, the spreader units 11 are six in number and are spaced symmetrically about the ring 10. The latter is composed of a flat metal strap, preferably of spring steel, and is deformable in its own plane as indicated by a broken line shown in Fig. 2.

Figure 1:
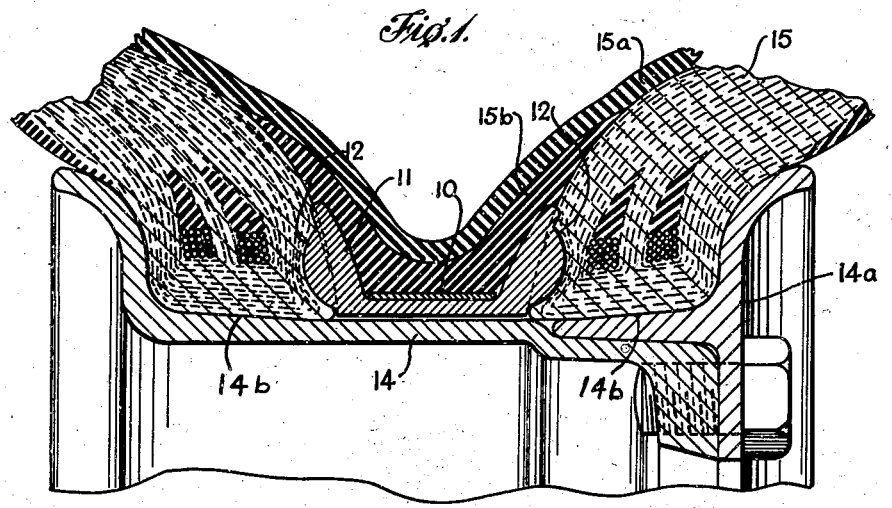
Fig. 1 is a transverse section of one embodiment of the improved bead lock, and a tire and rim structure with which it is operatively associated.

As shown in Fig. 4a, the spreader units 11 are of channel shape in section and are of somewhat greater length than width. They are longitudinally arcuate, their radius of curvature being such that the concave face of each unit will rest flush upon the perimeter of a tire rim, between the lateral flanges thereof. The spreader units are secured to the ring 10 in any suitable manner, as by being riveted or welded thereto. The spreader units are assembled on the band 10 with the latter disposed within the channel of each unit, the side flanges of the units extending radially outwardly therefrom. The units 11 may be made of metal forgings or stampings, but are shown herein as castings. The spreader units are designed to lie between the beads of a pneumatic tire casing and to force said beads apart so that they strongly engage the lateral flanges of a rim upon which the tire is mounted. To this end the sides of the channel shaped spreader units diverge outwardly, as shown in Fig. 1, so as to have wedging engagement with the toe portions of the tire beads. Preferably the outer lateral faces of the spreader units 11 are formed with a series of laterally projecting arcuate lugs 12, 12, which lugs press into the structure of the tire beads and thus increase the friction between said beads and the spreaders.

Referring to Fig. 1, the bead lock is shown in operative position with relation to a circumferentially divided tire rim 14, having a removable side flange 14a and tapered bead seats 14b. A pneumatic tire 15 mounted on the rim may be of standard construction, but preferably has a number of extra layers of rubber and fabric in the body thereof and extra heavy beads in order to adapt the tire to carry its load without collapse even though deflated. A standard tube 15a is received within the tire while a rubberized fabric or rubber flap 15b is positioned between the bead lock and the tube 15a to protect the tube.

It is desirable that the bead lock be prevented from moving relatively of the rim in a circumferential direction, and to this end an anti-creeping lug 16 is secured to the inner circumference of the ring 10, between two of the units 11 thereon, said lug 16 extending radially inwardly of the ring. The rim member 14 is slotted transversely at 17, from the margin thereof to which the side member 14a of the rim is attached, the lug 16 being receivable in said slot when the bead lock is being mounted on the rim. The arrangement is such that the lug 16 prevents the bead lock from moving circumferentially of the rim during service. The lug 16 is formed with an axial bore 18 that is of sufficient size to enable the angular valve stem of an inner tube to be extended therethrough, such a valve stem being shown in broken lines at 19, Fig. 4. Since the ring 10 is inextensible, the spreader units 11 are prevented from radially outward movement relatively of the rim and usually fit snugly onto the rim mounting same with sufficient clearance being provided to enable the bead lock to be slipped on or off the rim.

Figure 2:
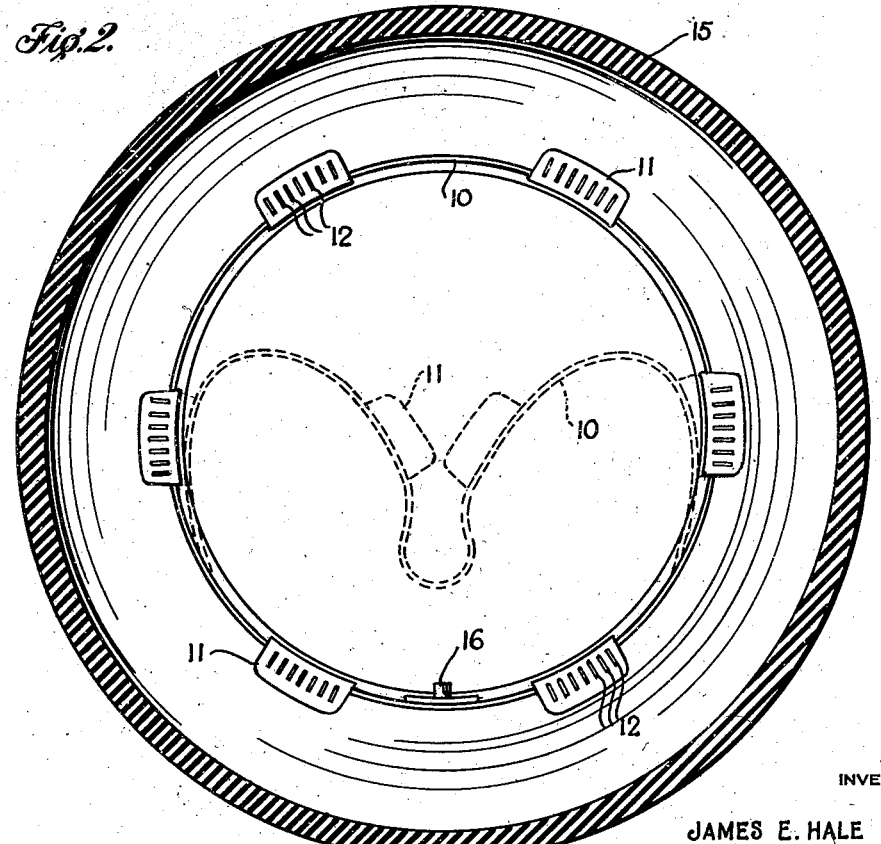
Fig. 2 is a side elevation of the bead lock, showing it mounted in a tire, which is shown in section, with the collapsed position of the bead lock being shown in dotted lines.

In assembling the bead lock with a tire and rim, the inner tube and flap of the tire first are inserted in the tire and then the bead lock is placed within the inner periphery of the tire with the valve stem of the inner tube extending through the apertured lug 16. Thereafter the bead lock is progressively mounted in the pneumatic tire casing, the flexible character of the ring 10 enabling the same to be deformed, as shown in Fig. 2, to facilitate this operation. In the assembly, the spreader units 11 are disposed between the beads of the tire casing. Next, the tire with the tube and bead lock device therein is mounted upon the rim member 14 by sliding it axially thereof into telescoping relation therewith, the projecting lug 16 of the spreader device being received within the slot 17 in said rim member. Thereafter the rim member 14a is mounted on the rim member 14 and bolted thereto. As the rim member 14a is bolted into place on the rim member 14, it engages the adjacent bead of the tire and urges it laterally toward the other tire bead. Such movement, however, is limited by reason of the interposed spreader elements 11, with the result that the tire beads and spreader units are pressed tightly together, the lugs 12 of the spreader units being forced somewhat into the tire beads, and the outer vertical faces of the tire beads are forced into tight frictional engagement with the lateral flanges of the tire rim, and with said tapered bead seats.

Thus it will be seen that the tire beads are restrained against relative movement circumferentially of a tire rim by reason of friction between the outer vertical faces of the tire beads and the lateral flanges of the tire rim, and the gripping action of lugs 12 and the friction between the inner vertical faces of the tire beads and the spreader units 11, and that the presence of pneumatic pressure within the tire is an immaterial factor in achieving this result. The radially inner faces of the tire beads are fixedly engaged by the tapered bead seats on the tire rim, as shown, and held under compression thereon by the lateral pressure on the beads. Such bead seat engagement aids in insuring that no relative rotational movement occurs between the tire and the rim mounting same.

The bead lock is of relatively simple construction, it is easily mounted in the tire, it requires no modification of standard rim construction, and it achieves the other advantages set out in the foregoing statement of objects. Obviously each bead lock construction is made for a specific size tire and rim.

Fig. 5 of the drawings shows the bead lock of Figs. 1 to 4, mounted upon a split wheel 41, which comprises disc members 42 and 43 each of which has a laterally outwardly extending flange 44 formed thereon, and each of which is preferably formed with a tapered bead seat 42a and 43a. The flanges 44 combine to form a tire rim on which the pneumatic tire 15 is mounted. Bolts 45 removably secure the wheel sections together. It will be appreciated that other types of wheels may be used in combination with the bead locks of the invention, when desired.

Figure 6:
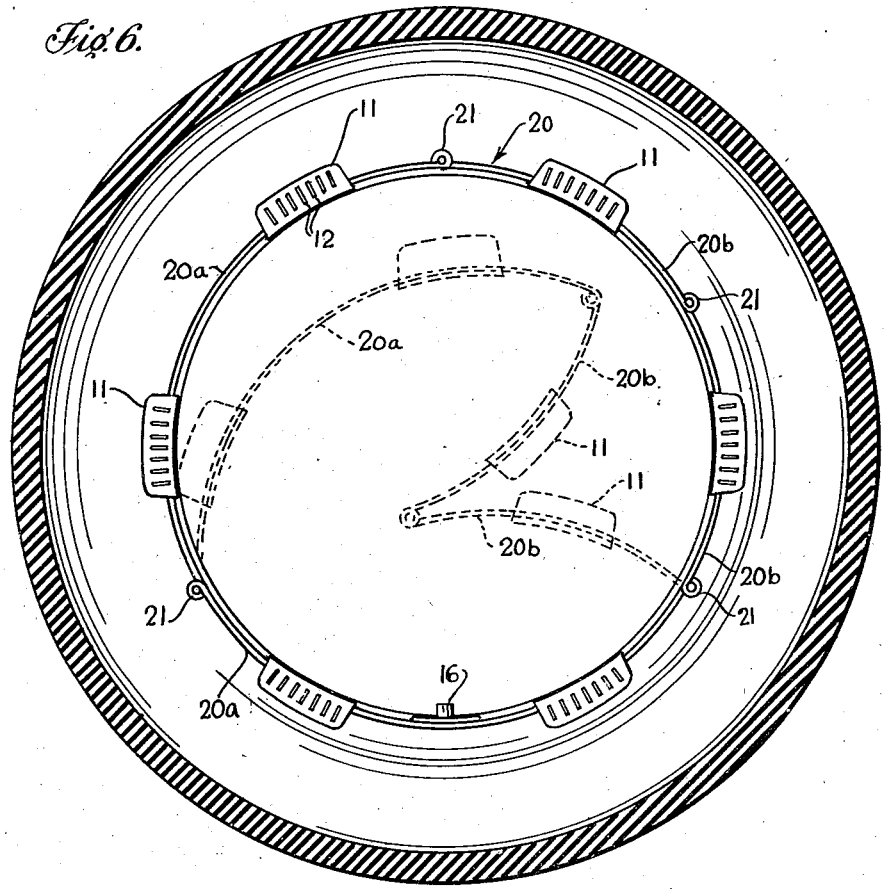
Fig. 6 is a side elevation of a modified type of bead lock, the collapsed position thereof being indicated in dotted lines.
Figure 7:
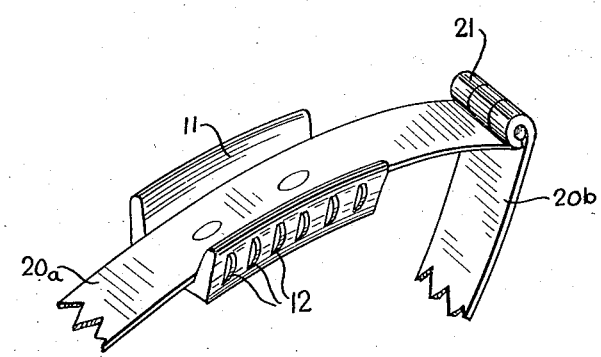
Fig. 7 is a perspective detail of one of the spreader elements shown in Fig. 6.

The embodiment of the invention shown in Figs. 6 and 7 of the drawings is essentially similar to that previously described, and comprises a plurality of spreader units 11 of the previously described embodiment, said spreader units being formed with laterally projecting lugs 12, 12. This embodiment of the bead lock of the invention differs from that previously described in the character of the structure upon which the units 11 are mounted. As shown in Figs. 6 and 7, said structure consists of an inextensible sectional annulus 20 comprising a plurality of arcuate metal elements 20a 20b, connected end to end by hinges 21, 21. As shown, there are two adjacent long sections 20a upon each of which two spreader units 11 are mounted, and two adjacent shorter sections 20b upon each of which one of the units 11 is mounted. The sections 20a and 20b are of metal in strip form, and are relatively stiff as compared to the metal of the ring 10 of the previously described structure. The arrangement is such that the supporting structure of the units 11 may be collapsed, as indicated in broken lines, to facilitate the insertion of the bead locks into a pneumatic tire casing.

The embodiment of the invention shown in Figs. 8 to 10 of the drawings differs somewhat from the previously described embodiments of the invention both in the construction of the spreader units and the construction of the structure on which the units are mounted. Thus the spreader units, designated 25, have the same external shape as the units previously described, and are formed on their exterior lateral faces with lugs 26, 26, but within their channel-shaped structures are formed at each side with integral ears 27, 27 herein shown as three in number at each side of the channel. As shown, the middle ear 27 on each side of the channel is formed on the base of the channel and the ears at each side thereof are formed on the sides of the channel. The spreader units 25 are mounted upon a pair of endless, inextensible, flexible wire cables 28, 28 at uniformly spaced regions circumferentially thereof. The units 25 are attached to the cables through the agency of the ears 27, which are crimped upon the cables and confine the same in the corners at the base of each unit. This embodiment of the invention is mounted for service substantially in the same manner as those previously described, and in service it functions in the same manner as the others. In use the cables take a polygonal shape with portions of the cables tangent to the rim, but in general taking a circular form. It will be appreciated that in some cases it may be desirable to use only one wire cable to secure the spreader units together. In such case the ears 27 may be formed along the center of the units 25, if desired. It will be understood that other means may be employed for attaching the cables 28 to the spreader units. For example the cables may be brazed or welded to the spreaders, in which case a plain spreader would be employed, such as spreader 11.

It will be seen that each of the embodiments of the invention employs a plurality of spreaders maintained in a circular series by an annular collapsible or deformable band. Other means may readily occur to one skilled in the tire and wheel art, of making the spreader retainer means collapsible or deformable. It is only necessary that the bead lock assembly be so constructed and arranged that it may be inserted with facility into its position in a tire casing even though the beads and body of the tire are so stiff as to be able to support their load without inflation of the inner tube.

Other modifications may be resorted to without departing from the spirit of the invention, or the scope thereof as defined by the appended claims.

What is claimed is:

1. In a bead lock for tire and rim assemblies, the combination of a plurality of longitudinally arcuate spreader units adapted to be assembled about the perimeter of a tire rim between inextensible beads of a tire thereon, and an endless, inextensible, metal ring for encircling the tire rim and to which said spreader units are fixedly secured, the endless ring being deformable to the extent that it may be collapsed within a smaller compass to be inserted within the inextensible beads of a pneumatic tire, and then restored to its original ring shape, with the spreader units extending between said beads of the tire.

2. In a bead lock for tire and rim assemblies, the combination of a plurality of longitudinally arcuate spreader units adapted to be assembled about the perimeter of a tire rim between inextensible beads of a tire thereon, and an endless, inextensible, metal ring for encircling the tire rim and to which said spreader units are fixedly secured, the endless ring being composed of a flexible metal band which may be collapsed withing a smaller compass to be inserted within the inextensible beads of a pneumatic tire, and then restored to its original ring shape, with the spreader units extending between said beads of the tire.

3. In a bead lock for tire and rim assemblies, the combination of a plurality of longitudinally arcuate spreader units adapted to be assembled about the perimeter of a tire rim between inextensible beads of a tire thereon, and an inextensible endless, metal ring for encircling the tire rim and to which said spreader units are fixedly secured, the endless ring being composed of a plurality of arcuate sections hinged together in end-to-end relation, and adapted to collapse into smaller compass to enable it to be inserted within the beads of the pneumatic tire.

4. In a bead lock for tire and rim assemblies, the combination of a plurality of longitudinally arcuate spreader units adapted to be assembled about the perimeter of a tire rim between inextensible beads of a tire thereon, and an inextensible endless, metal ring for encircling the tire rim and to which said spreader units are affixed, the endless metal ring being a flexible cable capable of being deformed to enable it to be inserted within the beads of the pneumatic tire.

5. In a bead lock for tire and rim assemblies, the combination of a plurality of longitudinally arcuate spreader units adapted to be associated about the perimeter of a tire rim in spaced apart relation between inextensible beads of a tire thereon, and an endless inextensible wire cable for encircling the tire rim, said spreader units being fixedly attached to said cable.

6. In a bead lock for tire and rim assemblies, the combination of a plurality of longitudinally arcuate spreader units adapted to be assembled about the perimeter of a tire rim between inextensible beads of a tire thereon, and a pair of endless inextensible flexible metal cables for encircling the tire rim, said spreader units being fixedly secured to said cables in circumferentially spaced relation.

7. In a bead lock for tire and rim assemblies, the combination of a plurality of spreader units adapted to be associated about the perimeter of a tire rim in circumferentially spaced relation between inextensible beads of a tire on said rim, said units being of channel shape in transverse section, and a pair of endless inextensible parallel flexible wire cables for encircling the tire rim and fixedly connected to each of said spreader units, said cables being disposed within the channels of said units.

8. In a bead lock for tire and rim assemblies, the combination of a plurality of longitudinally arcuate spreader units adapted to be associated about the perimeter of a tire rim in spaced apart relation between inextensible beads of a tire thereon, and a pair of parallel endless inextensible wire cable for encircling the tire rim, said spreader units being attached to each of said cables, each spreader unit being integrally formed with a plurality of ears that are disposed within the channel of the unit and crimped upon the cables therein to secure the unit fixedly to said cables.

JAMES E. HALE.